(12) United States Patent
Kim et al.

(10) Patent No.: US 9,933,883 B2
(45) Date of Patent: Apr. 3, 2018

(54) MOBILE TERMINAL AND TOUCH COORDINATE PREDICTING METHOD THEREOF

(71) Applicant: LG ELECTRONICS INC., Seoul (KR)

(72) Inventors: Byoungeul Kim, Seoul (KR); Yeongkyu Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/760,065

(22) PCT Filed: Jan. 23, 2014

(86) PCT No.: PCT/KR2014/000661
§ 371 (c)(1),
(2) Date: Jul. 9, 2015

(87) PCT Pub. No.: WO2014/129753
PCT Pub. Date: Aug. 28, 2014

(65) Prior Publication Data
US 2015/0355778 A1  Dec. 10, 2015

(30) Foreign Application Priority Data
Feb. 19, 2013  (KR) .................. 10-2013-0017675

(51) Int. Cl.
*G06F 3/041*  (2006.01)
(52) U.S. Cl.
CPC .................. *G06F 3/0416* (2013.01)

(58) Field of Classification Search
CPC ....................... G06F 3/041–3/04897
See application file for complete search history.

(56) References Cited

U.S. PATENT DOCUMENTS

| 8,487,896 | B1 * | 7/2013 | Brown ................. G06F 3/0418 345/173 |
| 2002/0015024 | A1 * | 2/2002 | Westerman ........... G06F 3/0235 345/173 |
| 2010/0073318 | A1 * | 3/2010 | Hu .......................... G06F 3/044 345/174 |
| 2011/0298742 | A1 * | 12/2011 | Dingnan ............. G06F 3/03545 345/173 |

(Continued)

FOREIGN PATENT DOCUMENTS

WO  WO 2012/156686 A1  11/2012

*Primary Examiner* — Roberto Flores
(74) *Attorney, Agent, or Firm* — Birch, Stewart, Kolasch & Birch, LLP

(57) ABSTRACT

The present invention relates to a mobile terminal capable of predicting a future touch movement based on a previous touch movement, and applying the future touch movement onto a screen, and a touch coordinate predicting method thereof. Each touch coordinate with respect to a touch movement detected on an application screen is displayed. A change of previous touch coordinates is checked at a time point when a touch coordinate is displayed. A touch coordinate predictive value is calculated based on previous touch coordinates, and then the calculated touch coordinate predictive value is applied onto a current touch coordinate. Under such configuration, a response time, which occurs between a finger's movement and an actual character movement (or a drawing output) due to touch input lag, can be reduced.

17 Claims, 9 Drawing Sheets

CASE WHERE DIRECTION CHANGE OF TOUCH MOVEMENT IS LARGE → MAINLY AMPLIFY ACCELERATION COMPONENT

CASE WHERE DIRECTION CHANGE OF TOUCH MOVEMENT IS SMALL → MAINLY AMPLIFY SPEED COMPONENT

(56) References Cited

U.S. PATENT DOCUMENTS

| | | | |
|---|---|---|---|
| 2011/0310118 A1 | 12/2011 | Asmi et al. | |
| 2012/0154324 A1 | 6/2012 | Wright et al. | |
| 2012/0169646 A1 | 7/2012 | Berkes et al. | |
| 2012/0192056 A1* | 7/2012 | Migos | G06F 17/241 715/230 |
| 2012/0194444 A1* | 8/2012 | Chang | G06F 3/04883 345/173 |
| 2012/0206380 A1 | 8/2012 | Zhao et al. | |
| 2012/0223894 A1* | 9/2012 | Zhao | G06F 3/0488 345/173 |
| 2013/0021272 A1 | 1/2013 | Wang | |
| 2013/0100071 A1* | 4/2013 | Wright | G06F 3/044 345/174 |
| 2013/0106716 A1* | 5/2013 | Sundara-Rajan | G06F 3/0416 345/173 |
| 2013/0181908 A1* | 7/2013 | Santiago | G06F 3/041 345/173 |
| 2014/0108994 A1* | 4/2014 | Medlock | G06F 3/0237 715/773 |
| 2014/0168104 A1* | 6/2014 | Zhou | G06F 3/0416 345/173 |
| 2014/0198052 A1* | 7/2014 | Tokutake | G06F 3/041 345/173 |
| 2014/0304656 A1* | 10/2014 | Li | G06F 3/0482 715/830 |
| 2015/0149957 A1* | 5/2015 | Enomoto | G06F 3/038 715/784 |
| 2015/0355740 A1* | 12/2015 | Yumoto | G06F 3/041 345/173 |
| 2016/0041689 A1* | 2/2016 | Yumoto | G06F 3/0418 345/174 |

* cited by examiner

[Fig. 1]
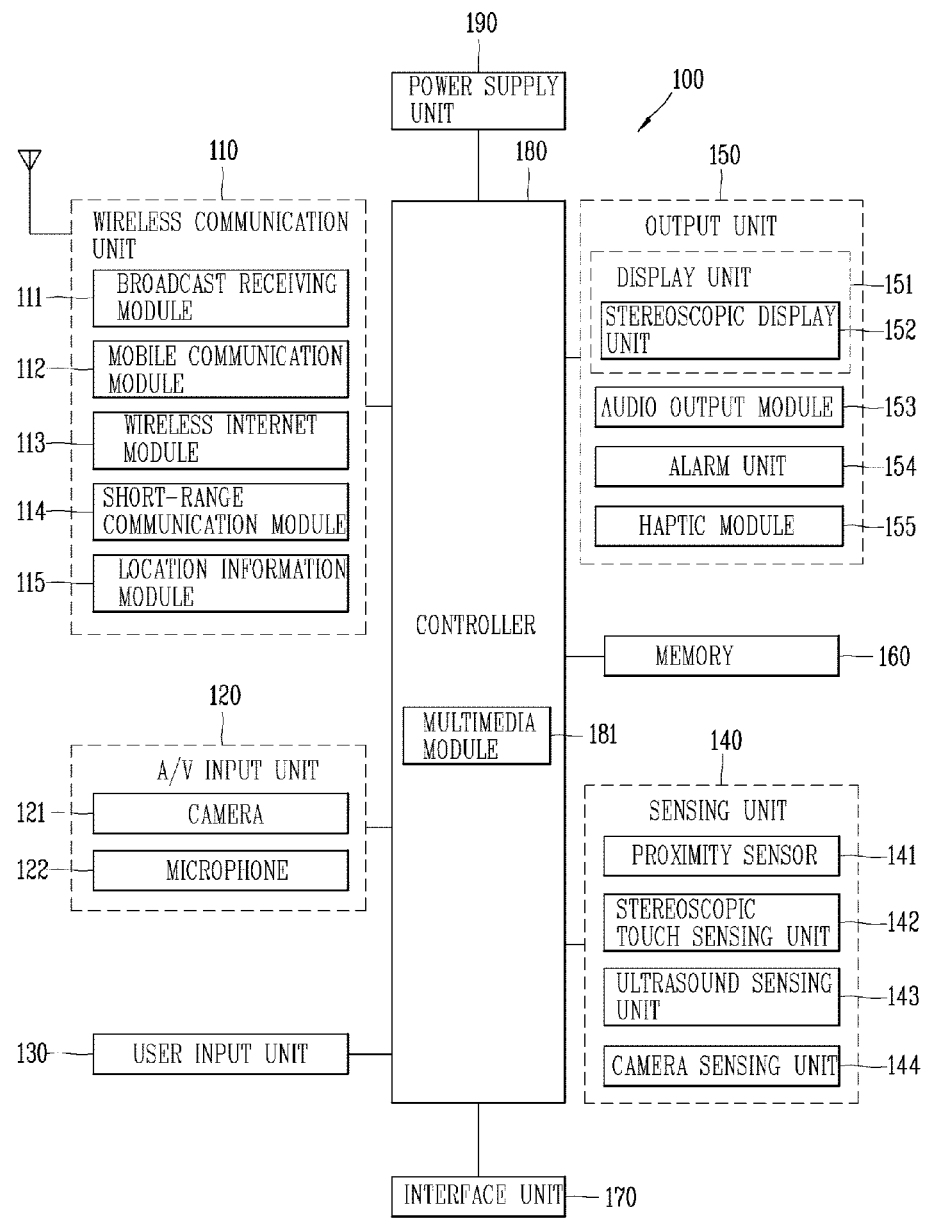

[Fig. 2a]
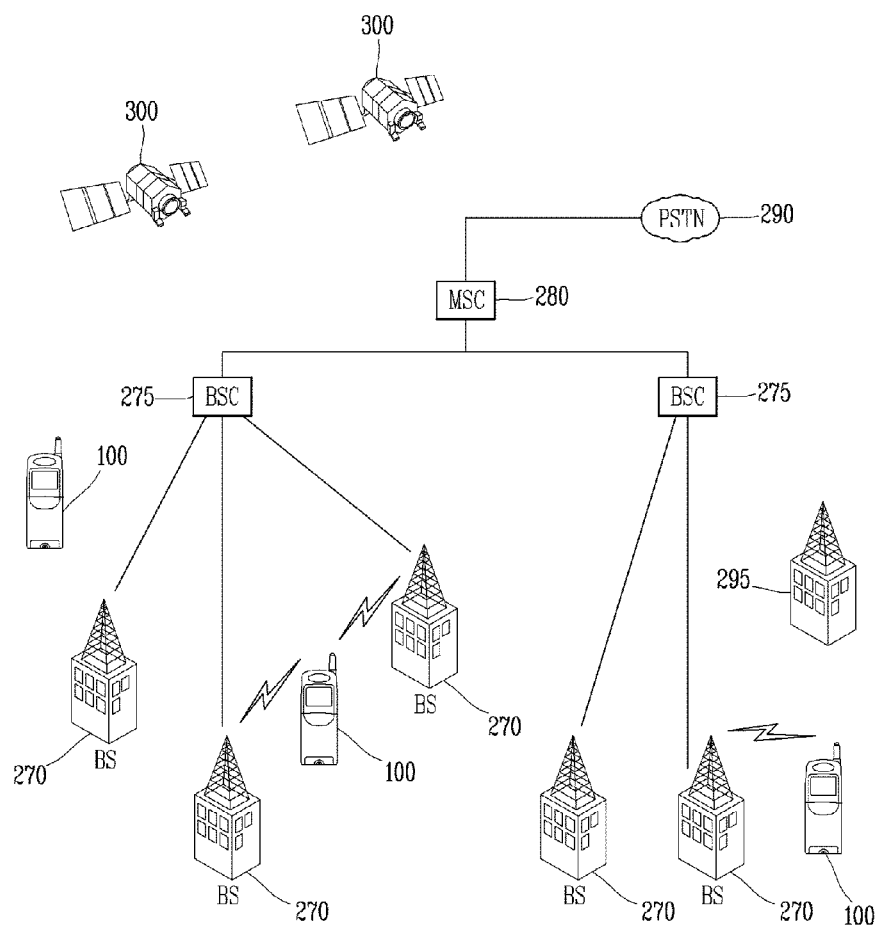

[Fig. 2b]
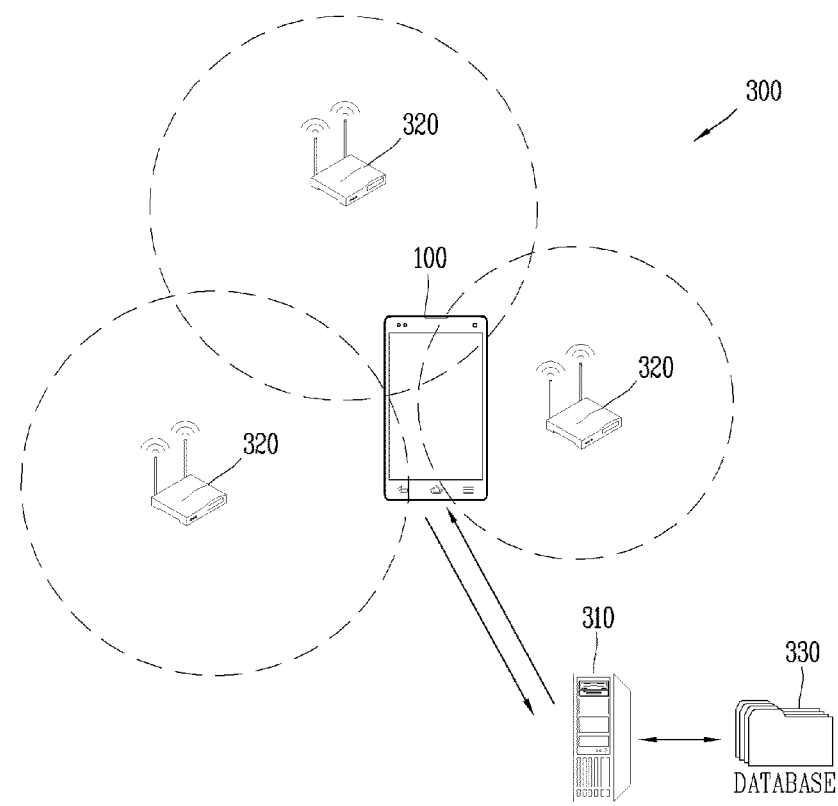
[Fig. 3]
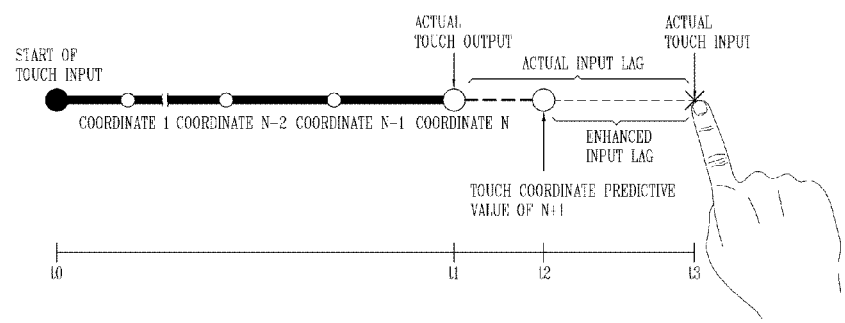

[Fig. 4]
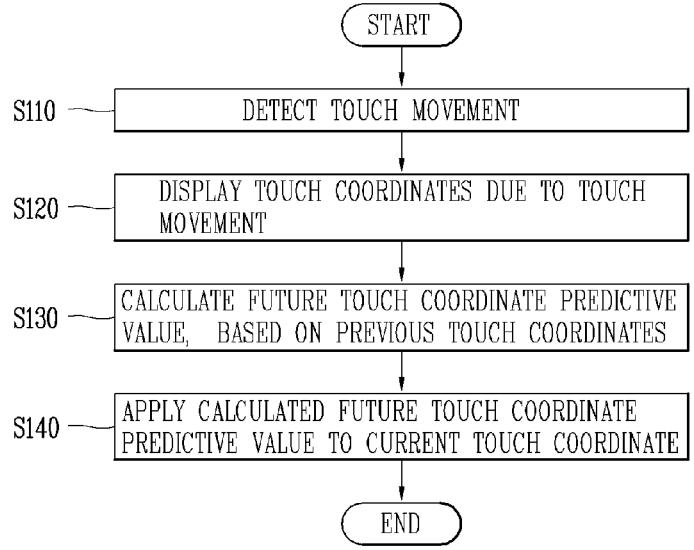
[Fig. 5]
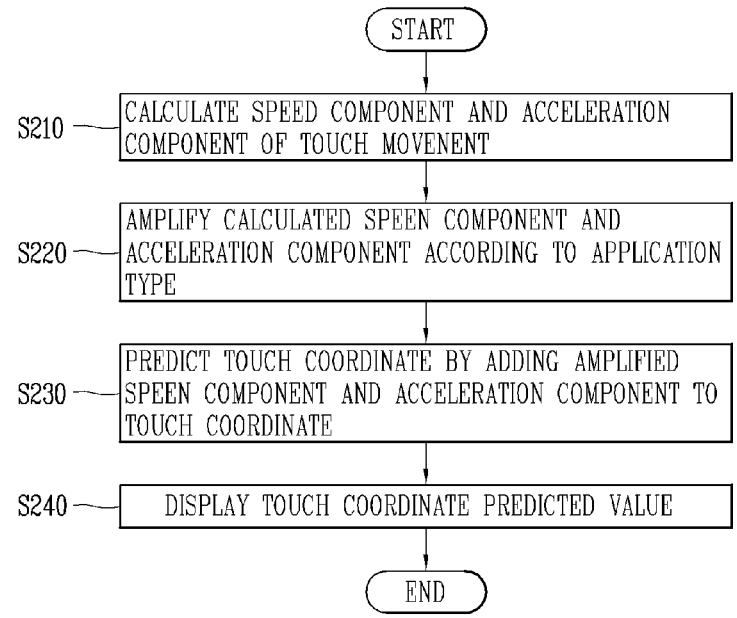

[Fig. 6]
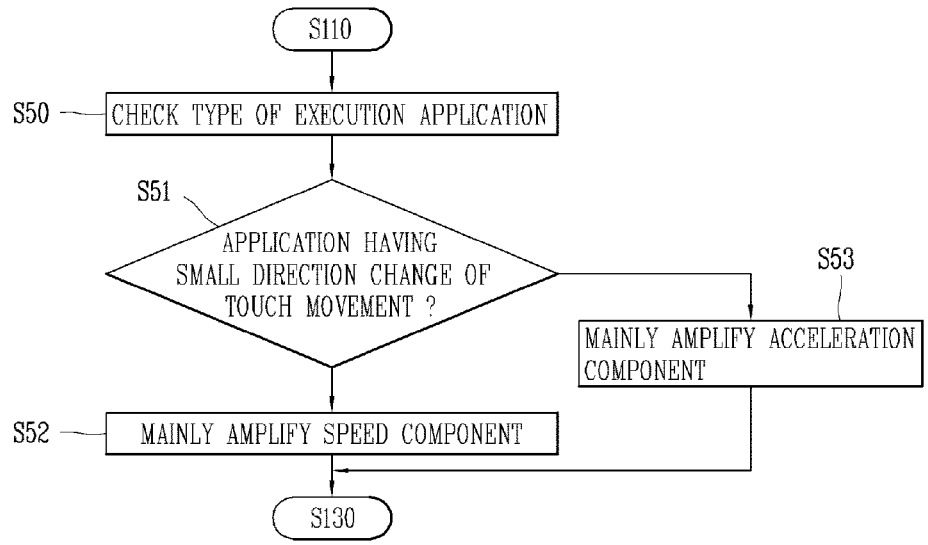
[Fig. 7]
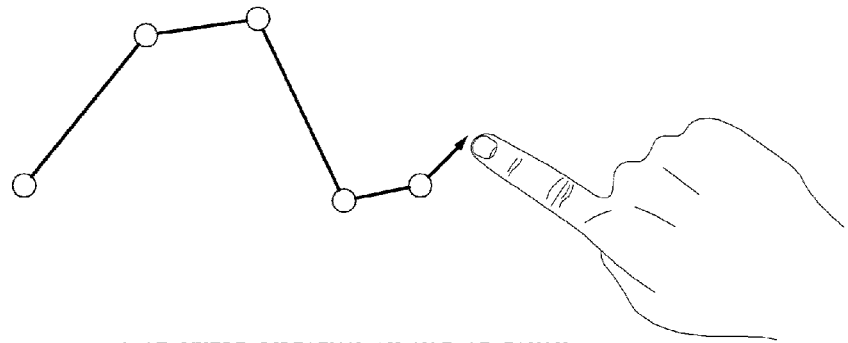
CASE WHERE DIRECTION CHANGE OF TOUCH
MOVEMENT IS LARGE ⟶ MAINLY AMPLIFY
ACCELERATION COMPONENT
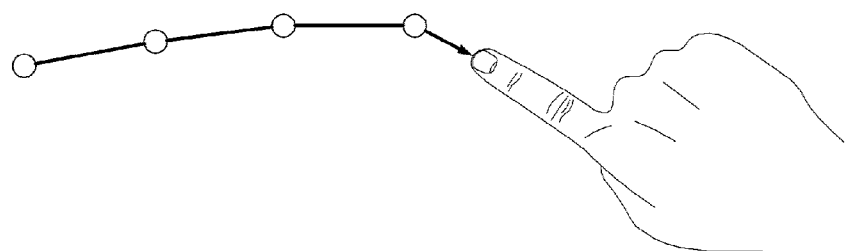
CASE WHERE DIRECTION CHANGE OF TOUCH
MOVEMENT IS SMALL ⟶ MAINLY AMPLIFY
SPEED COMPONENT

[Fig. 8]
| TOUCH RESPONSE SPEED IS SET TO BE ACCELERATED | |
|---|---|
| TOUCH INPUT LAG OCCURRING IN GAME, ETC. IS ENHANCED IF TOUCH RESPONSE SPEED IS SET TO BE ACCELERATED ON APPLICATION | |
| APPLICATION 1 | ☐ |
| APPLICATION 2 | ☐ |
| GAME 1 | ✓ |
| GAME 2 | ☐ |
[Fig. 9]
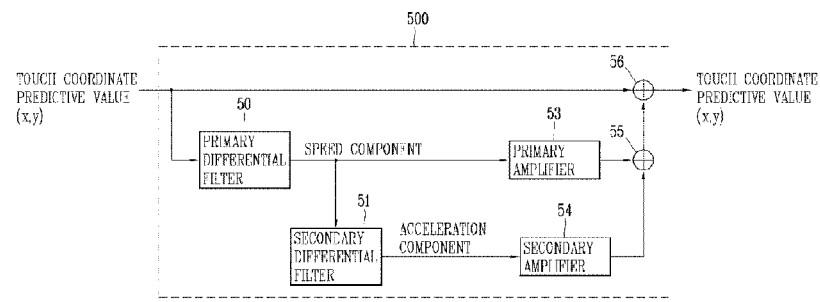
[Fig. 10a]
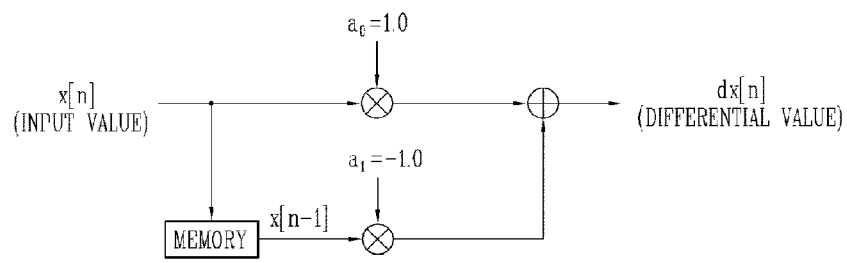
[Fig. 10b]
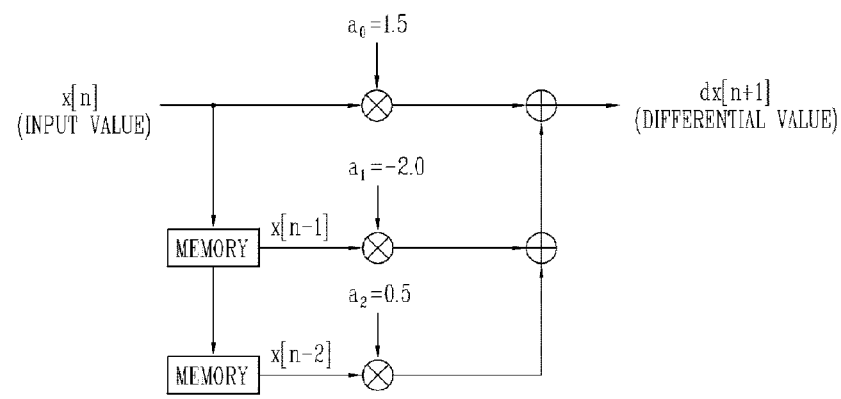

[Fig. 11]
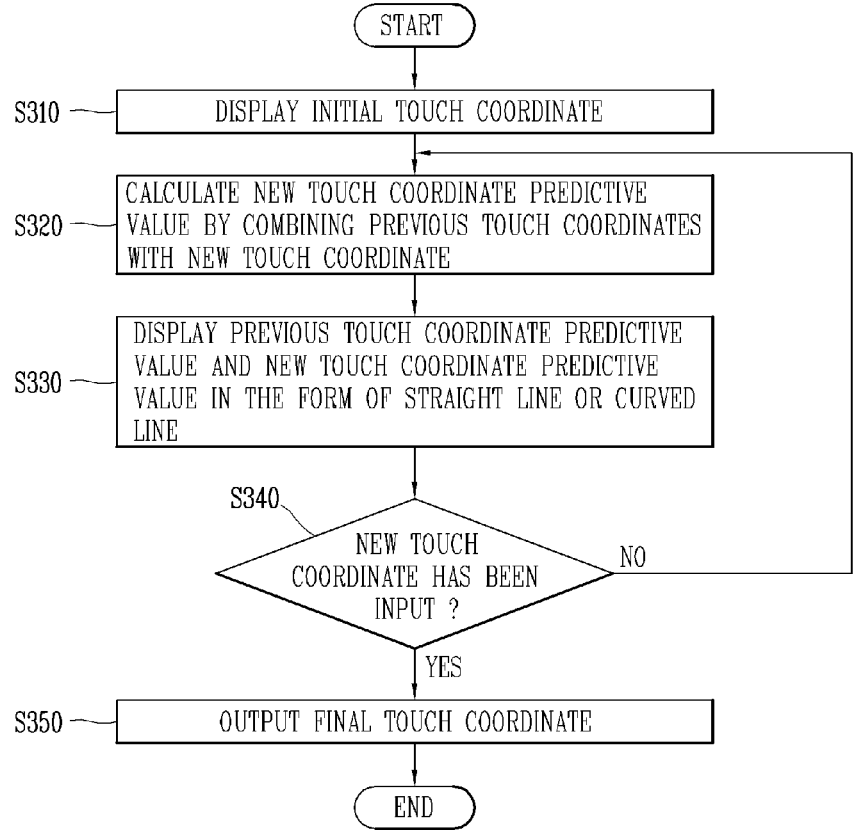
[Fig. 12a]
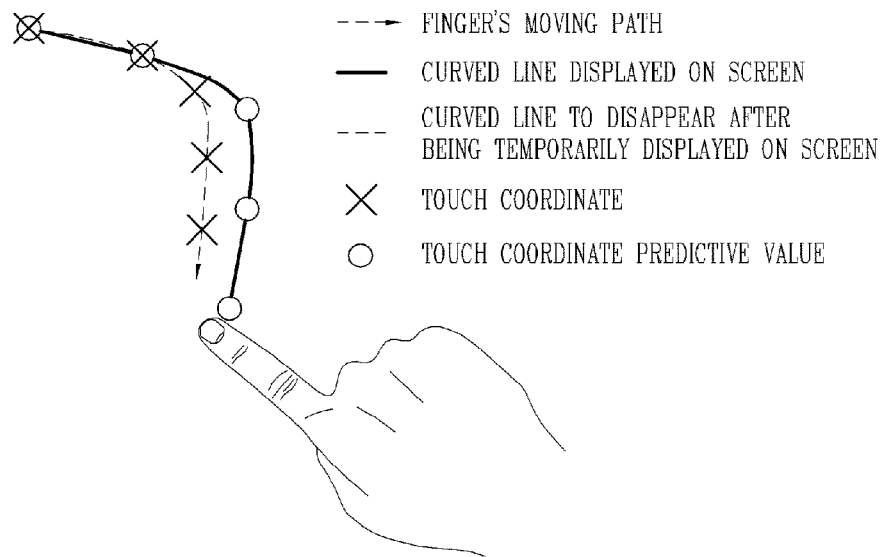

[Fig. 12b]
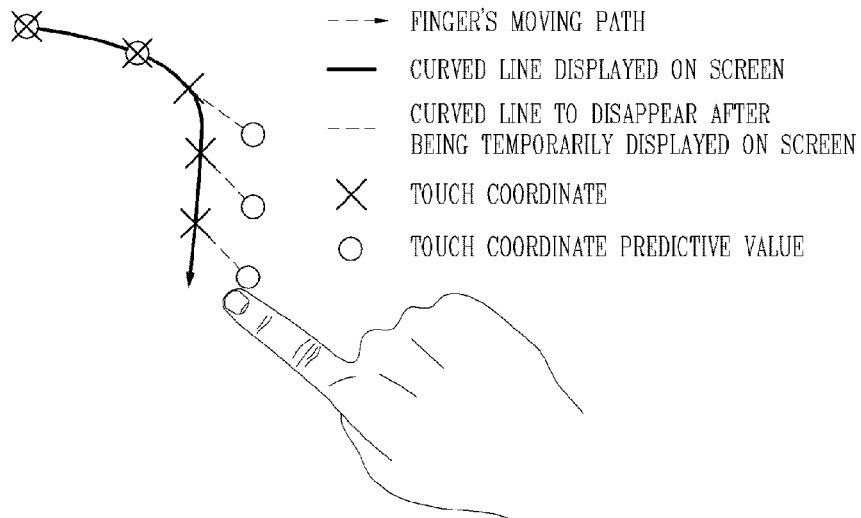
- - - → FINGER'S MOVING PATH
—— CURVED LINE DISPLAYED ON SCREEN
- - - CURVED LINE TO DISAPPEAR AFTER BEING TEMPORARILY DISPLAYED ON SCREEN
✕ TOUCH COORDINATE
○ TOUCH COORDINATE PREDICTIVE VALUE
[Fig. 13a]
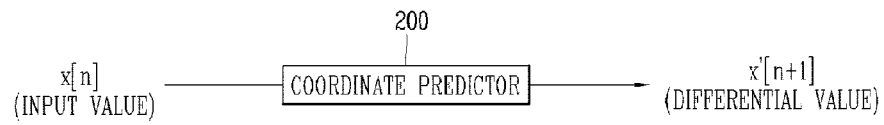
[Fig. 13b]
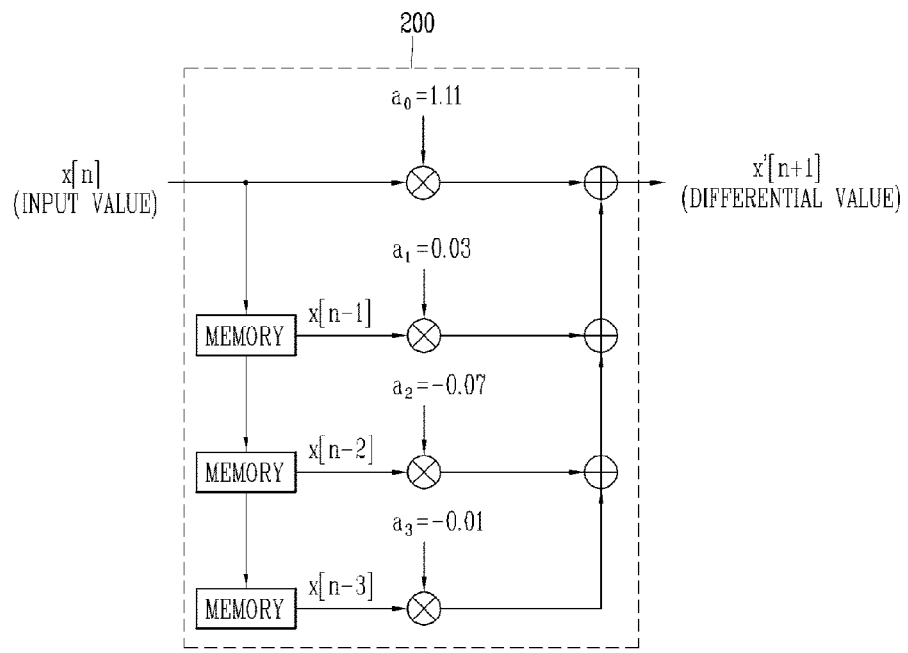

[Fig. 14a]
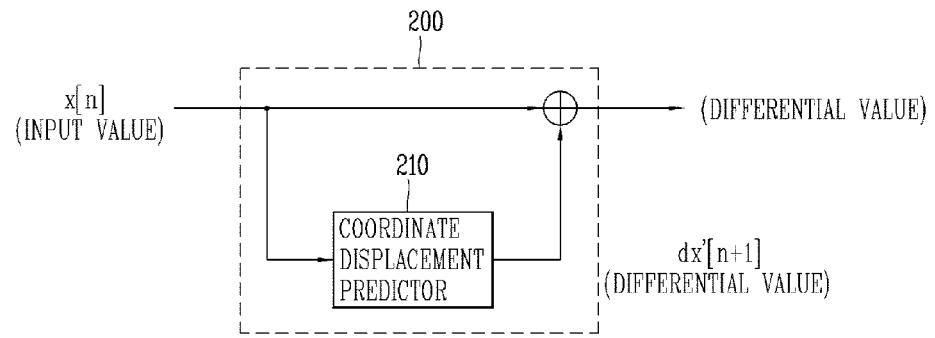
[Fig. 14b]
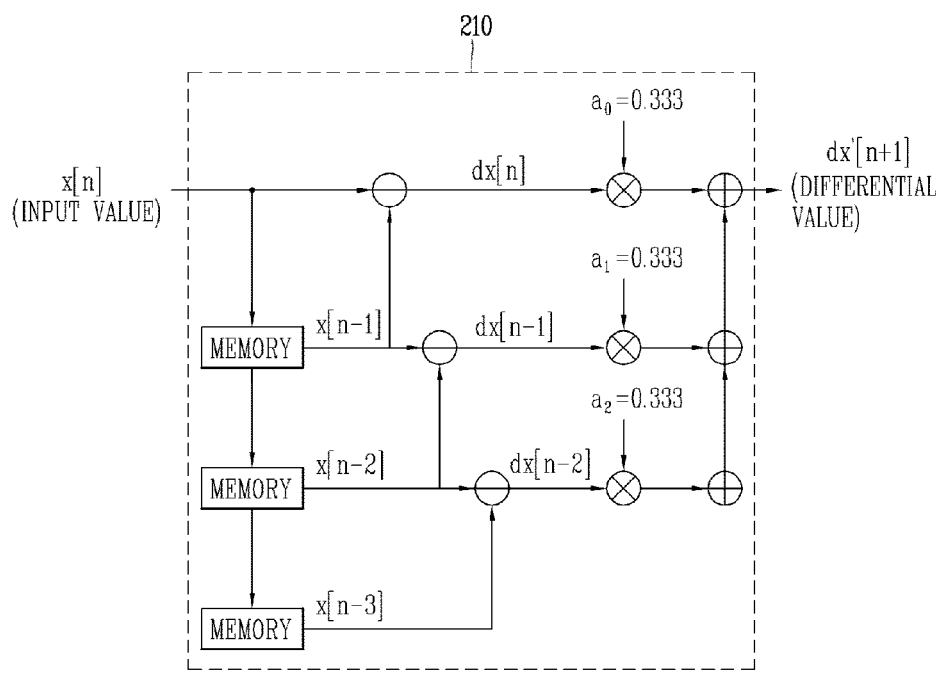

MOBILE TERMINAL AND TOUCH COORDINATE PREDICTING METHOD THEREOF

CROSS REFERENCE TO RELATED APPLICATIONS

This application is the National Phase of PCT International Application No. PCT/KR2014/000661, filed on Jan. 23, 2014, which claims priority under 35 U.S.C. 119(a) to Patent Application No. 10-2013-0017675, filed in the Republic of Korea on Feb. 19, 2013, all of which are hereby expressly incorporated by reference into the present application.

TECHNICAL FIELD

The present invention relates to a mobile terminal capable of reducing touch input lag by predicting a future touch movement based on a previous touch movement, and by applying the future touch movement onto a screen, and a touch coordinate predicting method thereof.

BACKGROUND ART

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal.

In the conventional touch screen-based device such as a personal digital assistant (PDA), a user's interest in a touch function and a graphic function of a device was low, because an H/W basic function of the device is low. However, as a touch screen-based smart phone becomes popular and an H/W function of a device becomes high in recent years, a touch function and a graphic function visible to a user are considered as an important factor.

Generally, in a touch screen-based device, input lag is generated due to a difference between a time point to input a user's actual touch coordinate and a time point to output the input touch coordinate on a screen. In the touch screen-based device, a game is one of important applications. In case of manipulating a game character movement by moving a touch coordinate, a character movement has a response time to a finger's movement, due to touch input lag. Such delayed response time causes a user not to well-concentrate on a game.

In the touch screen-based device, a drawing application is also one of important applications. Once a user directly draws a drawing on a screen of the device using his or her finger, a stylus pen, etc., the drawing application displays a touch path on the screen using input touch coordinates. In this case, the touch path is displayed on the screen after a response time lapses from a user's touch input time point.

Due to the input lag, there occur delay of coordinate generation in a touch-related H/W, delay of coordinate processing in a touch-related S/W, delay of output due to a display refresh rate, etc. Such input lag causes a user's concentration to directly draw on paper, to be lowered.

SUMMARY OF THE INVENTION

An object of the present invention is to provide a mobile terminal capable of reducing touch input lag occurring due to a difference between a touch input time and a touch output time on a screen, and a touch coordinate predicting method thereof.

To achieve these and other advantages and in accordance with the purpose of the present invention, as embodied and broadly described herein, there is provided a touch coordinate predicting method of a mobile terminal, the method comprising: detecting a consecutive touch movement on an application screen; displaying a touch output with respect to the detected touch movement; calculating a touch coordinate predictive value, based on a change of previous touch coordinates; and displaying the calculated touch coordinate predicted value in an addition manner to a current touch coordinate.

Preferably, the touch output may be displayed after a predetermined time, based on a time point when the touch movement has been ended.

The step of calculating a touch coordinate predictive value may include: extracting a speed component and an acceleration component of the touch movement by differentiating a previous touch coordinate; amplifying the extracted speed component and acceleration component with different ratios according to a type of an application being currently displayed; and calculating a touch coordinate predictive value by adding the amplified speed component and acceleration component, to a current touch coordinate.

Preferably, in the amplification step, if the application being currently displayed is an application having a small direction change of a touch movement, the speed component may be mainly amplified. On the other hand, if the application being currently displayed is an application having a large direction change of a touch movement, the acceleration speed component may be mainly amplified.

The step of calculating a touch coordinate predictive value according to another embodiment of the present invention may include calculating a new touch coordinate predictive value by combining previous touch coordinates with a new touch coordinate with weighted values.

The step of calculating a touch coordinate predictive value according to still another embodiment of the present invention may include: calculating a future touch coordinate displacement value, by performing a moving average process with respect to a previous touch coordinate displacement value; and generating a touch coordinate predictive value by adding the calculated future touch coordinate displacement value to a current touch coordinate.

To achieve these and other advantages and in accordance with the purpose of the present invention, as embodied and broadly described herein, there is also provided a mobile terminal, comprising: a display unit configured to display a prescribed application; and a controller configured to display a touch output with respect to a consecutive touch movement detected on an application screen, wherein the controller calculates a touch coordinate predictive value, based on a change of previous touch coordinates, and displays the calculated touch coordinate predictive value in an addition manner to a current touch coordinate.

Preferably, the touch output may be displayed after a predetermined time, based on a time point when the touch movement has been ended.

The controller may be configured to extract a speed component and an acceleration component of a touch movement, by differentiating previous touch coordinates using each differential filter. Then, the controller may amplify the speed component and acceleration component extracted by the respective differential filters, with different ratios according to a type of the application. Then, the controller may calculate a touch coordinate predictive value by adding the amplified speed component and acceleration component, to the current touch coordinate.

The controller may apply amplification ratios of the speed component and the acceleration component which are variable according to an application type, by reading them from a memory.

If the application being currently displayed is an application having a small direction change of a touch movement, the speed component may be mainly amplified. On the other hand, if the application being currently displayed is an application having a large direction change of a touch movement, the acceleration speed component may be mainly amplified.

The controller may be provided with a coordinate predictor for predicting a future touch coordinate predictive value based on previous touch coordinates. The coordinate predictor may include a primary differential filter configured to output a speed component by differentiating previous touch coordinates, and a secondary differential filter configured to output an acceleration component by differentiating the speed component output from the primary differential filter; a primary amplifier and a secondary amplifier configured to amplify the speed component and the acceleration component extracted by the primary differential filter and the secondary differential filter, respectively with different ratios according to a type of the application being currently displayed; an adder configured to add the speed component and the acceleration component amplified by the primary and secondary amplifiers, to a current touch coordinate.

The controller may form a touch path by connecting the calculated touch coordinate predictive value to the current touch coordinate in the form of a straight line or a curved line.

The controller may be provided with a coordinate predictor for calculating a new touch coordinate predictive value by combining previous touch coordinates with a new touch coordinate with weighted values.

The controller may be provided with a coordinate displacement predictor for calculating a future touch coordinate displacement value by performing a moving average process with respect to a previous touch coordinate displacement value. Accordingly the controller may generate a touch coordinate predictive value by adding the touch coordinate displacement value calculated by the coordinate displacement predictor to the current touch coordinate.

DETAILED DESCRIPTION OF THE INVENTION

The present invention can predits future touch coordinates based on a history of previous touch coordinates, and applys the predicted future touch coordinates to a screen. As a result, lowering of a user's concentration degree due to the conventional touch input lag can be improved.

Further, unlike in the conventional art where a touch reaction speed is enhanced at a level of a touch IC and a system, a touch reaction speed can be enhanced at an application level in the present invention.

BRIEF DESCRIPTION OF DRAWINGS

FIG. 1 is a block diagram of a mobile terminal according to an embodiment of the present invention;

FIG. 2A is a block diagram illustrating a wireless communication system where a mobile terminal according to an embodiment of the present invention can operate;

FIG. 2B is a configuration view of a Wi-Fi positioning system where a mobile terminal according to an embodiment of the present invention can operate;

FIG. 3 is a view illustrating a concept of touch coordinate prediction according to the present invention;

FIG. 4 is a flowchart illustrating a touch coordinate predicting method of a mobile terminal according to the present invention;

FIG. 5 is a flowchart illustrating a touch coordinate predicting method according to a first embodiment of the present invention, in a mobile terminal according to the present invention;

FIG. 6 is a flowchart illustrating an operation to control an amplification ratio of a speed component and an acceleration component according to an application type according to the present invention;

FIG. 7 is an exemplary view illustrating a change of a touch coordinate movement according to an application type;

FIG. 8 is a view illustrating an example to set, through menu setting, an application requiring decrease of input lag;

FIG. 9 is a block diagram of a coordinate predictor for predicting a touch coordinate according to the present invention;

FIGS. 10A and 10B are detailed views illustrating a configuration of a differential filter of FIG. 9;

FIG. 11 is a flowchart illustrating a touch coordinate predicting method according to a second embodiment, in a mobile terminal according to the present invention;

FIGS. 12A and 12B are views illustrating an example to display a touch coordinate path on a screen, using touch coordinate prediction from a drawing application;

FIGS. 13A and 13B are views illustrating another configuration of a coordinate predictor for predicting a touch coordinate according to the present invention; and FIGS. 14A and 14B are views illustrating still another configuration of a coordinate predictor for predicting a touch coordinate according to the present invention.

MODE FOR THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to un-necessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a Wireless Fidelity (Wi-Fi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a touch screen), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as contact touch. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omnidirectional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the display device 100 may be transmitted to the display device 100 through the WiFi location determination server 310, thereby acquiring the location information of the display device 100.

The present invention provides a method capable of enhancing lowering of a user's concentration degree due to touch input lag, by predicting a future touch coordinate using a history of previous touch coordinates, and by applying the predicted future touch coordinate onto a screen.

FIG. 3 is a view illustrating a concept of touch coordinate prediction according to the present invention.

As shown in FIG. 3, if a user starts a touch input at a time (t0) on a touch screen (display unit) and moves to the right, a touch output is displayed on the touch screen, in order of coordinate 1, coordinate 2, coordinate N−2 and coordinate N−1.

Once the user ends the touch input at a time (t3), a touch output of coordinate N is displayed on the touch screen due to input lag. As a result, input lag corresponding to t3−t1 occurs.

In the present invention, when a user starts a touch input at the time (t0) on the touch screen and the user moves to the right up to the time (t3), an additional future touch movement (coordinate N+1) is predicted based on the previous touch movement (coordinate 1, coordinate 2, . . . , coordinate N). Then, the additional future touch movement is displayed on the touch screen. Accordingly, if the user ends a touch input at the time (t3), time lag calculated by the coordinate predicting method of the present invention is t3−t2. This can reduce input lag between a touch input time point, and a touch output time point displayed on the touch screen, more than in the conventional art.

In the present invention, outputting a touch coordinate (touch coordinate value) does not mean displaying a touch coordinate in numbers, but means displaying a touch output in the form of a line.

Touch Coordinate Prediction

In a touch coordinate movement by a user, a coordinate change occurs by a speed component and an acceleration component. In an embodiment of the present invention, a speed component and an acceleration component of a touch movement are amplified, and then are added to the original touch coordinate, thereby predicting a touch coordinate to be generated in the future.

FIG. 4 is a flowchart illustrating a touch coordinate predicting method of a mobile terminal according to the present invention.

As shown in FIG. 4, the controller 180 detects a user's touch movement on an application screen. The touch movement means touch & drag operations.

Upon detection of the touch movement, the controller 180 displays (outputs) a touch coordinate corresponding to the touch movement, to thus display a touch coordinate path (S120).

When displaying the touch coordinate, the controller 180 checks a coordinate change due to the touch movement, and calculates a future touch coordinate predictive value based on previous touch coordinates (S130). The controller 180 displays the calculated touch coordinate predictive value, on the current touch coordinate in an addition manner (S140).

FIG. 5 is a flowchart illustrating a touch coordinate predicting method according to a first embodiment of the present invention, in a mobile terminal according to the present invention.

As shown in FIG. 5, upon detection of a user's touch movement on the display unit 151, the controller 180 calculates a speed component and an acceleration component of the detected touch movement (S210). A speed component of the detected touch movement is calculated by differentiating a touch coordinate (discrete signal value), and the acceleration component is calculated by re-differentiating the calculated speed component.

The controller 180 amplifies the calculated speed component and acceleration component with an amplification rate (S220). In this case, the controller 180 may determine a type of an application being currently executed on the display unit 151, and may apply different amplification ratios to the speed component and the acceleration component according to the determined application type.

Once the speed component and the acceleration component are amplified, the controller 180 adds the amplified speed component and acceleration component to the detected touch coordinate, thereby generating a touch coordinate predictive value and then displaying the generated touch coordinate predictive value on the display unit 151 (S230, S240).

FIG. 6 is a flowchart illustrating an operation to control an amplification ratio of a speed component and an acceleration component according to an application type according to the present invention, and FIG. 7 is an exemplary view illustrating a change of a touch movement according to an application type.

Once a speed component and an acceleration component of a touch movement are calculated in FIG. 5, the controller 180 checks a type of an application being currently executed on the display unit 151 (S50). Then, the controller 180 determines whether the application has a large direction change of a touch movement (S51).

If the application being currently executed is an application having a small direction change of a touch movement and required to have high accuracy of touch coordinate prediction as a touch moving path is displayed on a screen, e.g., a drawing application of FIG. 6, the controller 180 applies a relatively larger gain value to the speed component for amplification (S52).

For instance, an x-coordinate predictive value in the drawing application can be calculated as the following formula (1).

$$\text{Predicted Coordinate } (x\_out) = x\_in + 2*(x\_in') + 0.5*(x\_in'') \quad \text{[Formula 1]}$$

The x_in denotes an input coordinate, x_in' denotes a speed component, and x_in" denotes an acceleration component.

In this case, the controller 180 may amplify the speed component (X_in') by multiplying the speed component (X_in') by a gain value (2) in the above formula 1. Alternatively, the controller 180 may amplify the speed component (X_in') by multiplying the square of the speed component (X_in') by a gain value (2) in the above formula 1.

In the present invention, types of applications and a ratio of gain values with respect to a speed and an acceleration according to each application are stored in the memory 160 in the form of an additional table. Here, the applications have a small direction change of a touch movement, and are required to have an accurate touch coordinate predicted value. Set values inside the table may be changed by a user.

On the other hand, if the application being currently executed is an application having a drastic direction change of a touch movement and required to have touch coordinates which should rapidly follow a finger's moving path, rather than to have high accuracy of touch coordinate prediction, e.g., a game application, the controller 180 applies a relatively larger gain value to the acceleration speed component for amplification (S53).

For instance, an x-coordinate predictive value in a game application may be calculated as the following formula (2).

$$\text{Predicted coordinate } (x\_out) = x\_in + 0.5*(x\_in') + 5*(x\_in'') \quad \text{[Formula 2]}$$

In this case, the controller 180 may amplify the acceleration component (x_in") by multiplying the acceleration component (x_in") by a gain value (5) in the above formula 2. Alternatively, the controller 180 may amplify the acceleration component (x_in") by multiplying the acceleration component (x_in") by a gain value (5).

In the present invention, types of applications and a ratio of gain values with respect to a speed and an acceleration according to each application are stored in the memory 160 in the form of an additional table. Here, the applications have a drastic direction change of a touch movement, and are required to have touch coordinates which should rapidly follow a finger's moving path. Preset values in the table may be changed by a user.

FIG. 8 is a view illustrating an example to set, through menu setting, an application which requires decrease of input lag.

In a device like a smart phone where a user can directly install a required application for use, as shown in FIG. 7, a user may selectively use a touch coordinate prediction technique according to an application, by directly setting an application which requires decrease of input lag through menu setting.

FIG. 9 is a block diagram of a coordinate predictor 500 for predicting a touch coordinate according to the present invention.

As shown in FIG. 9, the coordinate predictor 500 includes a primary (first) differential filter 50 configured to output a speed component by differentiating an input touch coordinate; a secondary (second) differential filter 51 configured to output an acceleration component by differentiating the speed component output from the primary differential filter 50; a primary (first) amplifier 53 and a secondary amplifier 54 configured to amplify the speed component and the acceleration component extracted by the primary differential filter 50 and the secondary (second) differential filter 51, respectively; an adder 55 configured to add the speed component and the acceleration component output from the amplifiers 53 and 54, to the current coordinate; and an adder 56 configured to output a touch coordinate predictive value by adding the speed component and the acceleration component calculated by the adder 55, to the input touch coordinate.

That is, the primary differential filter 50 is configured to generate a speed discrete signal value by differentiating a touch coordinate. The secondary differential filter 51 is configured to generate an acceleration discrete signal value by re-differentiating the speed discrete signal value generated by the primary differential filter 50.

The coordinate predictor 500 is configured to calculate a touch coordinate in a mathematical manner, based on a previous touch coordinate history. The coordinate predictor 500 may be provided at the controller 180.

FIGS. 10A and 10B are detailed views illustrating a configuration of the differential filters of FIG. 9.

The primary differential filter 50 and the secondary differential filter 51 of the present invention are configured to receive a discrete signal value and to generate a differential value of the received discrete signal value. The differential filters may selectively use a history of previous touch coordinates (n−1, n−2, . . . ) by forming different filter degrees (orders). FIG. 10A illustrates a primary differential filter, and FIG. 10B illustrates a secondary differential filter. Here, 'a' denotes a filter coefficient.

FIG. 11 is a flowchart illustrating a touch coordinate predicting method according to a second embodiment, in a mobile terminal according to the present invention. FIG. 11 illustrates an example to apply a touch coordinate predicting method in a draw application.

As shown in FIG. 11, an initial touch coordinate is displayed on a screen as no sign or a point, in a drawing application (S310). A touch coordinate predictive value at this point is the same as the initial touch coordinate.

Once a new touch coordinate is input, the controller 180 calculates a new touch coordinate predictive value by combining previous touch coordinates and the new touch coordinate (S320). Then, the controller 180 displays, on the screen, a straight line or a curved line which connects a previous touch coordinate predictive value and the new touch coordinate predictive value to each other (S330).

The controller 180 checks whether a new touch coordinate has been input (S340). Whenever a new touch coordinate is input, the controller 180 repeatedly performs the step (S220). Upon input of a final touch coordinate, the controller 180 ends the drawings (S350).

In the second embodiment, the controller 180 may display an initial touch coordinate on a screen as no sign or a point. Upon input of a new touch coordinate, the controller 180 may calculate a new touch coordinate predictive value based on previous touch coordinates and the new touch coordinate. Then, the controller 180 may determine whether to use the calculated new touch coordinate predictive value on the screen.

In a case where it has been determined to use the calculated new touch coordinate predictive value, the controller 180 displays, on the screen, a straight line or a curved line which connects the new touch coordinate and the new touch coordinate predict value to each other. If there is, on the screen, a straight line or a curved line which connects a previous touch coordinate and a previous touch coordinate predictive value to each other, the controller 180 deletes the straight line or the curved line from the screen. Whenever a new touch coordinate is input, the controller 180 calculates a new touch coordinate predictive value to perform the above operation. Upon input of a final touch coordinate, the controller 180 ends the drawing.

FIGS. 12A and 12B are views illustrating an example to display a touch coordinate path on a screen, using touch coordinate prediction from a drawing application.

As shown in FIG. 12A, in case of displaying a touch coordinate path according to a first embodiment, a curved line is drawn on a screen along a touch coordinate predictive value, regardless of an actual touch coordinate. Accordingly, the method of displaying a touch coordinate path according to the first embodiment may be used when touch coordinate prediction accuracy is high, because a curved line quality displayed on the screen and a reaction speed is much improved.

On the other hand, as shown in FIG. 12B, in case of displaying a touch coordinate path according to a second embodiment, a curved line is drawn on a screen along actual touch coordinates. Whenever a new touch coordinate is additionally generated, a temporary curved line is formed between the new touch coordinate and a touch coordinate predictive value. The temporary curved line disappears upon generation of a next touch coordinate. In this case, a new temporary curved line is formed.

Accordingly, the method of displaying a touch coordinate path according to the second embodiment may be used when touch coordinate prediction accuracy is low. In the second embodiment, the controller 180 may determine whether to use a new touch coordinate predictive value whenever a new touch coordinate is generated.

For instance, the controller 180 may determine whether a touch moving path is a straight line or not, and may use a touch coordinate predictive value only when a user inputs a touch moving path in the form of a straight line. Whether a touch moving path is a straight line or not may be determined based on a difference between a new touch coordinate input angle $$\left( = \tan^{-1} \frac{y[n] - y[n-1]}{x[n] - x[n-1]} \right)$$

and a previous touch coordinate input angle $$\left( = \tan^{-1} \frac{y[n-1] - y[n-2]}{x[n-1] - x[n-2]} \right).$$

More specifically, when a difference therebetween is less than 15°, the controller 180 determines a touch moving path as a straight line.

As aforementioned, in the present invention, a touch coordinate predictive value may be mathematically calculated based on a history of previous touch coordinates.

FIGS. 13A and 13B are views illustrating another configuration of a coordinate predictor 200 for predicting a touch coordinate according to the present invention.

Referring to FIGS. 13A and 13B, a touch coordinate predictive value (x'[n+1]) may undergo an interpolation method or an extrapolation method using previous touch coordinates and information on touch coordinate-occurred time. Alternatively, a touch coordinate predictive value (x'[n+1]) may be calculated by combining previous touch coordinates with respective weighted values using the coordinate predictor 200 of FIG. 12A. An 'x' value and a 'y' value are predicted in the same manner, which are expressed as the following formula 3.

[Formula 3]

$$x'[n+1] = \sum_{k=0}^{p-1} a_k[k] \cdot x[n-k]$$

'ak' denotes a prediction filter coefficient, and 'p' denotes a filter degree.

For instance, under an assumption that the filter degree (p) is 4, and the prediction filter coefficient (ak) is 1.11, 0.03, −0.07 and −0.01, the touch coordinate predictive value (x'[n+1]) is calculated by the formula 3 and FIG. 12A. As a result, the touch coordinate predictive value (x'[n+1]) is obtained as the following formula 4.

$$x'[n+1]=x[n]\cdot 1.11+x[n-1]\cdot 0.03-x[n-2]\cdot 0.07-x[n-3]\cdot 0.01 \quad \text{[Formula 4]}$$

FIGS. 14A and 14B are views illustrating still another configuration of the coordinate predictor 200 for predicting a touch coordinate according to the present invention.

As shown in FIGS. 14A and 14B, the coordinate predictor 200 is provided with a coordinate displacement predictor 210 for predicting a future touch coordinate displacement value by performing a moving average process with respect to a previous touch coordinate displacement value. Accordingly, the coordinate predictor 200 predicts a future touch by adding the future touch coordinate displacement value predicted by the coordinate displacement predictor 210 to the current touch coordinate. For instance, the coordinate predictor 200 may calculate a future touch coordinate displacement value by performing a moving average process with respect to a previous touch coordinate displacement value using a quanternary moving average filter.

For instance, under an assumption that the filter degree (p) is 4, and the prediction filter coefficient (ak) is 0.333. 0.333. 0.333, the touch coordinate predictive value (x'[n+1]) is calculated by the formula 5. As a result, the touch coordinate predictive value (x'[n+1]) is obtained as the following formula 6.

$$dx[n]=x[n]-x[n-1]$$

$$dx[n-1]=x[n-1]-x[n-2]$$

$$dx[n-2]=x[n-2]-x[n-3] \quad \text{[Formula 5]}$$

$$dx'[n+1]=0.333\cdot dx[n]+0.333\cdot dx[n-1]+0.333\cdot dx[n-2] \quad \text{[Formula 6]}$$

Accordingly, a touch coordinate predictive value may be calculated by the following formula 7, i.e., by adding the calculated touch coordinate displacement value (x'[n+1]) to the current touch coordinate ((x[n]).

$$x'[n+1]=x[n]+dx'[n+1] \quad \text{[Formula 7]}$$

As aforementioned, in the present invention, future touch coordinates are predicted based on a history of previous touch coordinates, and are applied to a screen. As a result, lowering of a user's concentration degree due to the conventional touch input lag can be improved.

Further, unlike in the conventional art where a touch reaction speed is enhanced at a level of a touch IC and a system, a touch reaction speed can be enhanced at an application level in the present invention.

According to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet). The processor may include the controller of the mobile terminal.

The invention claimed is:

1. A touch coordinate predicting method of a mobile terminal, the method comprising:
    detecting a consecutive touch movement on an application screen;
    displaying a touch output in response to the detected touch movement;
    determining a type of an application being currently displayed on the application screen, the type of the application being determined by an extent of a direction change of the touch movement;
    retrieving, from a memory, a ratio of gain values of a speed component and an acceleration component corresponding to the determined type of the application;
    differently amplifying the speed component and the acceleration component of the touch movement with different amplification ratios according to the retrieved ratio of gain values;
    calculating a touch coordinate predictive value, by adding the amplified speed component and the amplified acceleration component, to a current touch coordinate of the touch output; and
    displaying the calculated touch coordinate predictive value and the current touch coordinate of the touch output.

2. The method of claim 1, wherein the touch output is displayed after a predetermined time, based on a time point when the touch movement has been ended.

3. The method of claim 1, wherein the calculating the touch coordinate predictive value includes extracting the speed component and the acceleration component of the touch movement by differentiating previous touch coordinates.

4. The method of claim 1, wherein the amplification ratios which are variable according to the type of the application are stored in a memory in the form of a table.

5. The method of claim 1, wherein the calculated touch coordinate predictive value and the current touch coordinate are displayed by being connected to each other in the form of a straight line or a curved line.

6. The method of claim 1, wherein the calculating the touch coordinate predictive value includes calculating a new touch coordinate predictive value by combining previous touch coordinates with a new touch coordinate with weighted values.

7. The method of claim 1, wherein the calculating the touch coordinate predictive value includes:
calculating a future touch coordinate displacement value, by performing a moving average process with respect to a previous touch coordinate displacement value; and
generating a touch coordinate predictive value by adding the calculated future touch coordinate displacement value to the current touch coordinate.

8. The method of claim 1, wherein the differently amplifying the speed component and the acceleration component of the touch movement includes:
amplifying the speed component with a larger gain value as compared to a gain value of the acceleration component if the application being currently displayed is a first application having a small direction change of the touch movement; and
amplifying the acceleration component with a larger gain value as compared to a gain value of the speed component if the application being currently displayed is a second application having a large direction change of the touch movement.

9. A mobile terminal, comprising:
a display unit configured to display a prescribed application; and
a controller configured to:
display a touch output in response to a consecutive touch movement detected on an application screen,
determine a type of an application being currently displayed on the application screen, the type of the application being determined by an extent of a direction change of the touch movement,
retrieve, from a memory, a ratio of gain values of a speed component and an acceleration component corresponding to the determined type of the application,
differently amplify the speed component and the acceleration component of the touch movement according to the retrieved ratio of gain values,
calculate a touch coordinate predictive value, by adding the amplified speed component and the amplified acceleration component to a current touch coordinate of the touch output, and
display the calculated touch coordinate predictive value and the current touch coordinate of the touch output.

10. The mobile terminal of claim 9, wherein the touch output is displayed after a predetermined time, based on a time point when the touch movement has been ended.

11. The mobile terminal of claim 9, wherein the controller is further configured to:
extract the speed component and the acceleration component of a touch movement, by differentiating previous touch coordinates using different differential filters.

12. The mobile terminal of claim 9, wherein the controller reads amplification ratios of the speed component and the acceleration component which are variable according to the type of application, from a memory.

13. The mobile terminal of claim 9, wherein the controller includes a coordinate predictor configured to calculate a future touch coordinate predictive value based on previous touch coordinates, and
wherein the coordinate predictor includes:
a first differential filter configured to output the speed component by differentiating previous touch coordinates, and a second differential filter configured to output the acceleration component by differentiating the speed component output from the first differential filter;
a first amplifier and a second amplifier configured to amplify the speed component and the acceleration component extracted by the first and second differential filters, respectively, with different ratios according to the type of the application being currently displayed; and
an adder configured to add the speed component and the acceleration component amplified by the first and second amplifiers, to the current touch coordinate.

14. The mobile terminal of claim 9, wherein the controller forms a touch path by connecting the calculated touch coordinate predictive value to the current touch coordinate in the form of a straight line or a curved line.

15. The mobile terminal of claim 9, wherein the controller includes a coordinate predictor configured to calculate a new touch coordinate predictive value by combining previous touch coordinates with a new touch coordinate with weighted values.

16. The mobile terminal of claim 9, wherein the controller includes a coordinate displacement predictor configured to calculate a future touch coordinate displacement value by performing a moving average process with respect to a previous touch coordinate displacement value, and
wherein the controller is configured to generate the touch coordinate predictive value by adding the touch coordinate displacement value calculated by the coordinate displacement predictor, to the current touch coordinate.

17. The mobile terminal of claim 9, wherein the controller is further configured to:
amplify the speed component with a larger gain value as compared to a gain value of the acceleration component if the application being currently displayed is a first application having a small direction change of the touch movement, the first application is a drawing application, and
amplify the acceleration component with a larger gain value as compared to a gain value of the speed component if the application being currently displayed is a second application having a large direction change of the touch movement, the second application is a game application.

* * * * *